United States Patent [19]

Jean

[11] Patent Number: 5,782,434
[45] Date of Patent: Jul. 21, 1998

[54] SELF-CLOSING PIVOTING DOOR THRUST REVERSER WITH GEAR ACTUATED PANEL

[75] Inventor: Michel Christian Marie Jean, Harfleur, France

[73] Assignee: Societe Hispano Suiza, Saint Cloud Cedex, France

[21] Appl. No.: 800,043

[22] Filed: Feb. 14, 1997

[51] Int. Cl.$^6$ ........................................ F02K 1/70
[52] U.S. Cl. ........................ 244/110 B; 239/265.29; 239/265.37; 60/226.2; 60/229
[58] Field of Search ............... 244/110 B; 239/265.25, 239/265.27, 265.29, 265.33, 265.37; 60/226.2, 228, 229, 232

[56] References Cited

U.S. PATENT DOCUMENTS

| | | |
|---|---|---|
| 2,798,362 | 7/1957 | Rainbow et al. .............. 239/265.29 |
| 3,764,096 | 10/1973 | Wright ......................... 244/110 B |
| 4,407,120 | 10/1983 | Timms . |
| 5,039,171 | 8/1991 | Lore . |
| 5,097,662 | 3/1992 | Vieth ........................ 244/110 B X |
| 5,209,057 | 5/1993 | Remlaoui . |

*Primary Examiner*—William Grant
*Attorney, Agent, or Firm*—Bacon & Thomas

[57] ABSTRACT

A thrust reverser for a turbojet engine is disclosed having a thrust reverser door and a thrust reverser panel pivotally attached to a housing so as to pivot in opposite directions about the same pivot axis. An epicyclic gear mechanism interconnects the housing, the thrust reverser door and the thrust reverser panel such that the thrust reverser door and the thrust reverser panels move in opposite directions about the common pivot axis when moving between their forward thrust and reverse thrust positions.

7 Claims, 4 Drawing Sheets

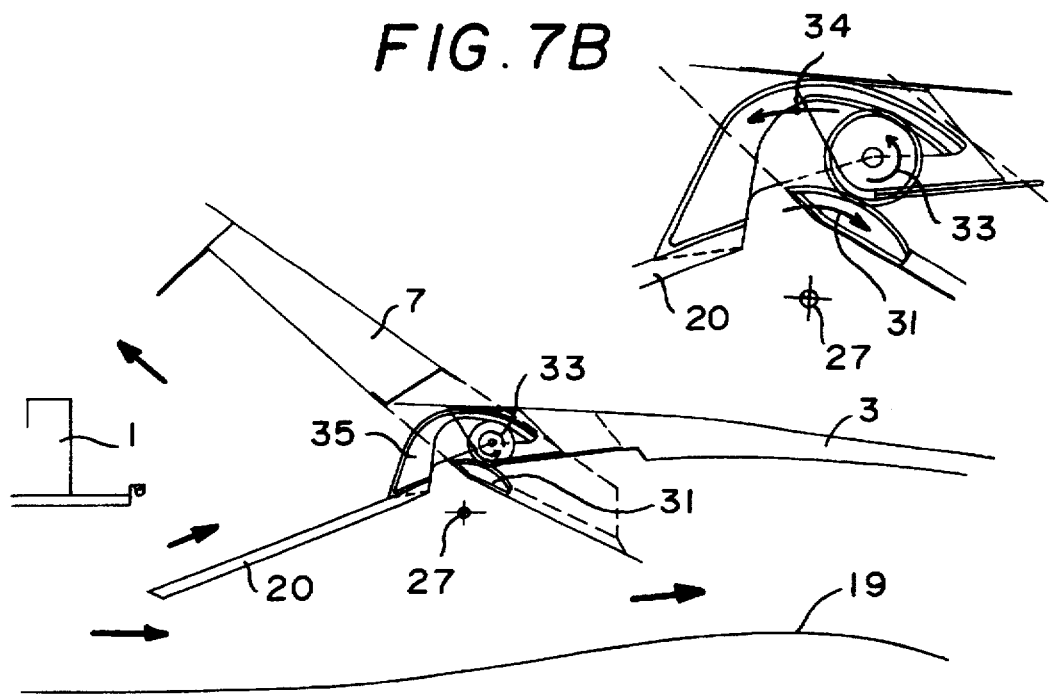
FIG. 7B
FIG. 7A
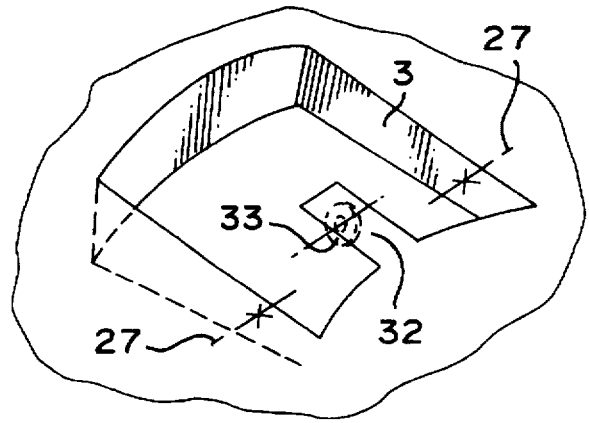
FIG. 6
FIG. 8
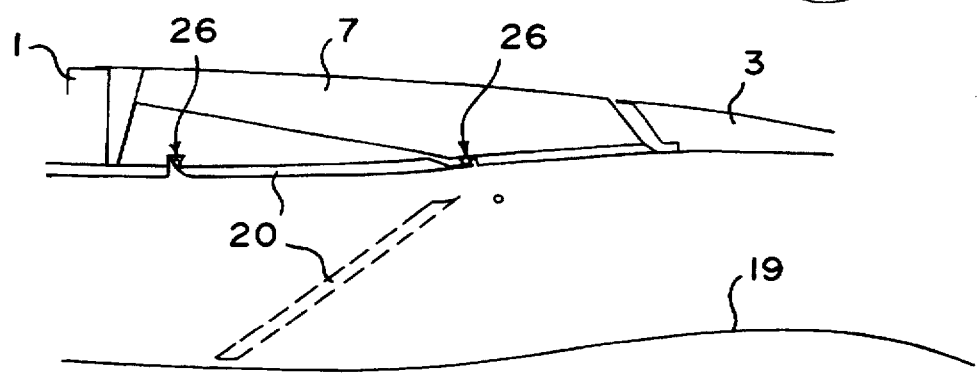

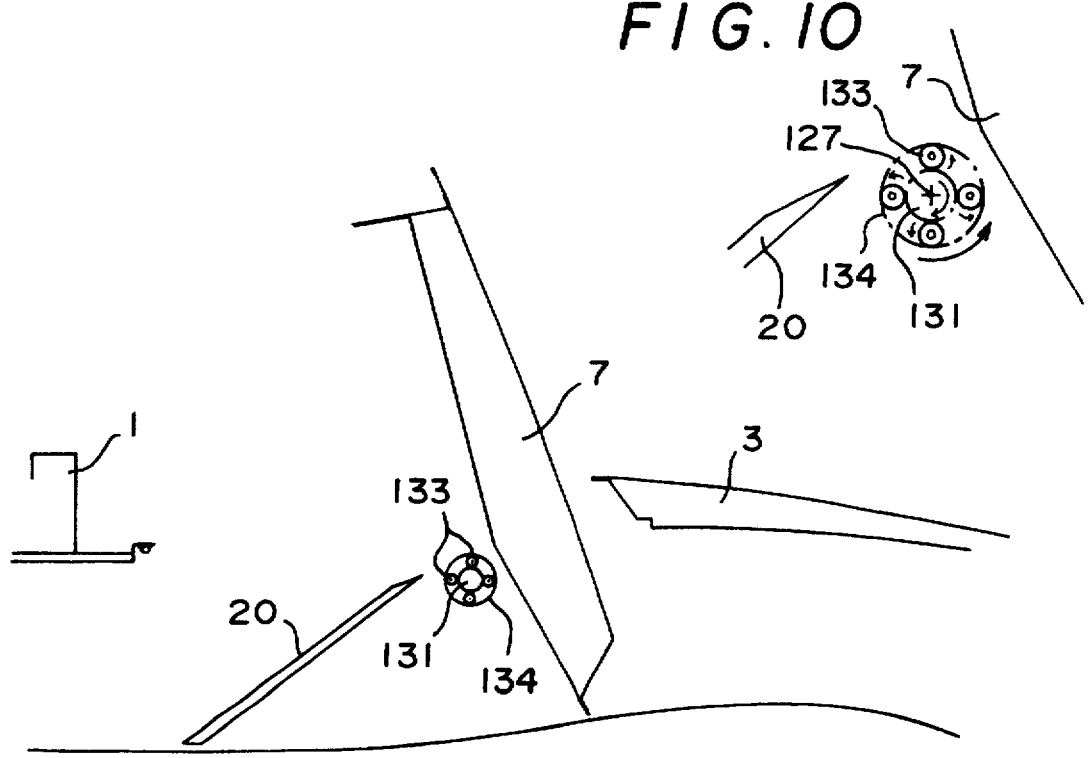
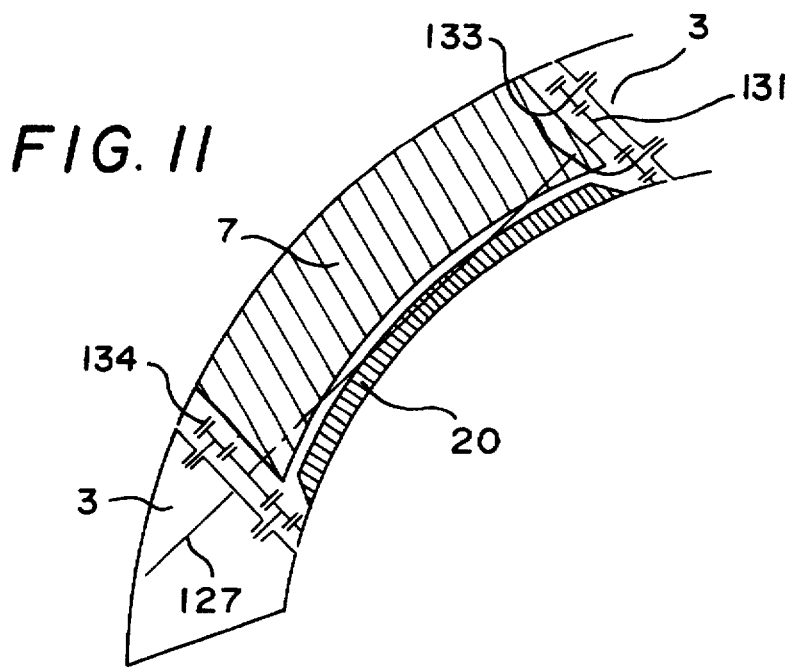

SELF-CLOSING PIVOTING DOOR THRUST REVERSER WITH GEAR ACTUATED PANEL

BACKGROUND OF THE INVENTION

The present invention relates to a thrust reverser for a turbofan-type turbojet engine in which pivotable thrust reverser doors change the direction of flow of gases passing through a cold-flow air duct to provide thrust reversing forces.

Turbofan-type turbojet engines are well-known in the art and comprise an annular housing concentrically arranged around the turbojet engine housing to define a generally annular cold flow gas duct extending along the longitudinal axis of the engine. A fan, driven by the turbojet engine, is located in the upstream portion of the cold flow gas duct to force a gas, such as air, through the duct and to augment the thrust of the turbojet engine.

In such turbofan-turbojet engines having a high bypass ratio, a thrust reversing device may be associated with the annular housing to redirect at least a portion of the air passing through the cold flow gas duct to provide a thrust reversing force. It is known to provide one or more pivotable thrust reversing doors in the annular housing to redirect the cold flow gas laterally outwardly through lateral openings in the housing.

A known prior art pivoting door thrust reverser, set forth in U.S. Pat. No. 5,039,171, is illustrated in FIGS. 1 and 2. As can be seen, the thrust reverser comprises thrust reverser door 7 located on a housing having an upstream portion 1 and a downstream housing portion 3. The door 7 is pivotally attached to longitudinally extending portions of the housing interconnecting the upstream portion 1 and the downstream portion 3 so as to pivot about axis 27 between a forward thrust position, illustrated in FIG. 1, and a reverse thrust position, illustrated in FIG. 2. When in the forward thrust position, an outer surface 9 of the thrust reverser door 7 lies substantially flush with the outer surfaces of the upstream portion 1 and the downstream portion of the housing so as to provide an aerodynamic outer surface to the housing. In this position, an inner surface 11 of the thrust reverser door 7 forms a portion of the outer boundary of the air duct through which the gases are directed.

This known system also incorporates a thrust reverser panel 20 that is pivotally attached to the housing so as to pivot about an axis 28, spaced from axis 27, between a forward thrust position, illustrated in FIG. 1, and a reverse thrust position illustrated in FIG. 2. The thrust reverser panel 20 is connected to a thrust reverser door 7 by link 22 such that both the panel and the door move simultaneously between their forward thrust positions and their reverse thrust positions.

An actuator, in this particular instance a hydraulic cylinder having an extendible and retractable piston rod, is attached to a structure 6 forming a part of the upstream portion 1 of the housing and has the piston rod pivotally connected to inner structure 12 of the thrust reverser door 7 by pivot 10. Extension of the piston rod causes the thrust reverser door 7 and the thrust reverser panel 20 to move from their forward thrust positions to their reverse thrust positions, while retraction of the piston rod causes these elements to return to their forward thrust positions. The thrust reverser door 7 may incorporate a deflector 13, also known in the art, to impart a forward direction to the gases being redirected by the thrust reverser door when in its reverse thrust position.

This known thrust reversing system improves the forward thrust performance of the turbofan engine since the inner surfaces of the thrust reverser door and the thrust reverser panel 20 form a part of the outer boundary of the duct which provides smooth, aerodynamic gas flow through the duct.

While this known system has been generally successful, in special cases, it has characteristics which may be undesirable. For instance, when the aerodynamic flow lines assume certain configurations, especially regarding a shallow flow, the pressure from the gasses acting on the thrust reverser panel 20 urge it toward its open or reverse thrust position. The kinematic constraints imposed upon this design locate the pivot axis 28 towards the rear, or downstream, portion of the thrust reverser panel 20 such that the length $l_1$ between the pivot axis 28 and the rearmost edge of the thrust reverser panel 20 is less than length $l_2$ between the axis 28 and the front, or upstream, edge of the thrust reverser panel 20. Thus, the resultant of the forces acting on the inner surface of the thrust reverser panel 20 will generate a torque in the direction of arrow p1 on the thrust reverser panel 20, which, in turn, is transmitted to the thrust reverser door 7 via the link rod 22 in the direction of arrow F1. The direction of this force F1 will generate a torque about pivot axis 27 in the direction of arrow p3 urging the thrust reverser door 7 toward its reverse thrust position. This will occur even if the pressure from the gases in the flow duct acting on the inner surface of the thrust reverser door 7 produce self-cancelling torques in the direction of arrows p3 and p2 due to the relatively equal length $l_3$ and $l_4$ between the downstream edge of the inner surface of the thrust reverser door 7 and the pivot axis 27, and the distance between the upstream edge of the inner surface of the thrust reverser door 7 and the pivot axis 27, respectively.

Another drawback occurs due to the kinematic geometry of this system. As best illustrated in FIG. 2, a recess or cut-out is required in the upstream edge of the thrust reverser panel 20 to provide clearance between this edge and the actuator 8. Such a recess may be relative large which will degrade the structural strength of the thrust reverser panel 20 while increasing the difficulty of sealing the front edge of the panel 20 when in its forward thrust position.

SUMMARY OF THE INVENTION

A thrust reverser for a turbojet engine is disclosed having a thrust reverser door and a thrust reverser panel pivotally attached to a housing so as to pivot in opposite directions about the same pivot axis. An epicyclic gear mechanism interconnects the housing, the thrust reverser door and the thrust reverser panel such that the thrust reverser door and the thrust reverser panels move in opposite directions about the common pivot axis when moving between their forward thrust and reverse thrust positions.

In one embodiment, the epicyclic gear mechanism has a sun gear segment fixedly located on the thrust reverser door so as to move with the door, a planet pinion gear rotatably attached to the housing and engaging the sun gear segment, and a ring gear segment fixedly attached to the thrust reverser panel and engaging the planet pinion gear.

In another embodiment, the epicyclic gear mechanism may comprise a sun gear affixed to the thrust reverser door, the plurality of planet pinion gears rotatably affixed to the housing and engaging the sun gear, and a ring gear affixed to the thrust reverser panel and engaging the plurality of the planet pinion gears.

In each embodiment, an actuator, which may be connected to the thrust reverser door, or to the epicyclic gear mechanism causes the thrust reverser door to move in one direction about the common pivot axis and will simultaneously cause the thrust reverser panel to move in an opposite direction about the same pivot axis. When the thrust reverser door and the thrust reverser panel are in their forward thrust positions, the force acting on an inner surface of the thrust reverer panel due to the pressurized gases within the duct bounded by the housing will urge the thrust reverser door to stay in its forward thrust position, thereby preventing any in inadvertant deployment of the thrust reverser door towards the reverse thrust position.

BRIEF DESCRIPTION OF THE DRAWINGS

FIG. 6 is a perspective view of a portion of the housing forming the lateral opening illustrating the attachment of the planet gear.

FIG. 7A is a partial, cross-sectional view of the embodiment illustrated in FIGS. 3 and 4, illustrating the partial deployment of the thrust reverser door and the thrust reverser panel.

FIG. 7B is an enlarged view of the epicyclic gear mechanism illustrated in FIG. 7A.

FIG. 8 is a partial, cross-sectional view of the embodiment illustrated in FIGS. 3 and 4.

FIG. 9 is a partial, cross-sectional view of a second embodiment of the present invention illustrating the thrust reverser door and the thrust reverser panel in their reverse thrust position.

FIG. 10 is an enlarged view of the epicyclic gear mechanism utilized in the embodiment illustrated in FIG. 9.

FIG. 11 is a partial, transverse cross-sectional view of the embodiment illustrated in FIGS. 9 and 10.

DETAILED DESCRIPTION OF THE PREFERRED EMBODIMENT

Figure 1:
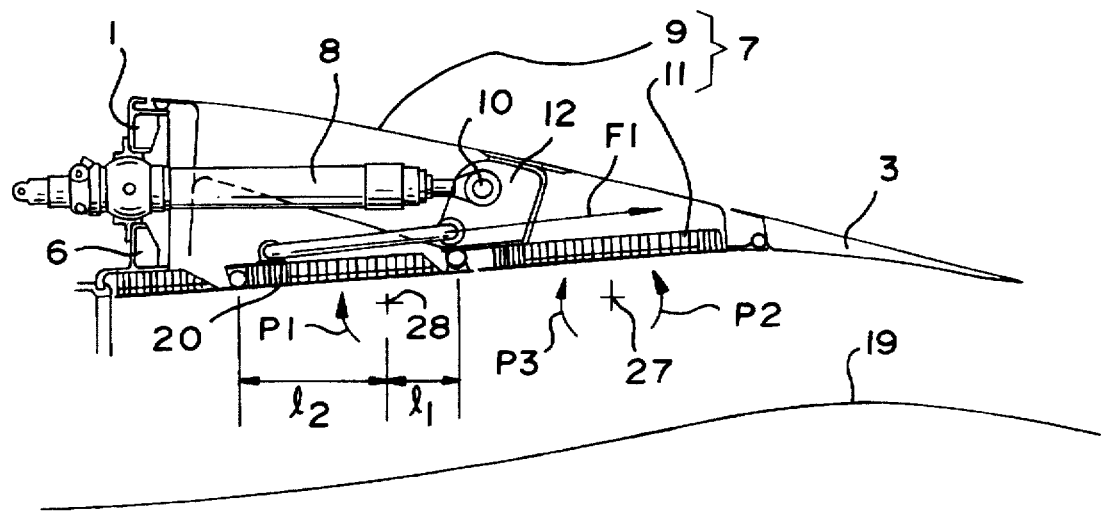
FIG. 1 is a partial, cross-sectional view of a known thrust reverser illustrating the forward thrust positions of the thrust reverser door and the thrust reverser panel.
Figure 2:
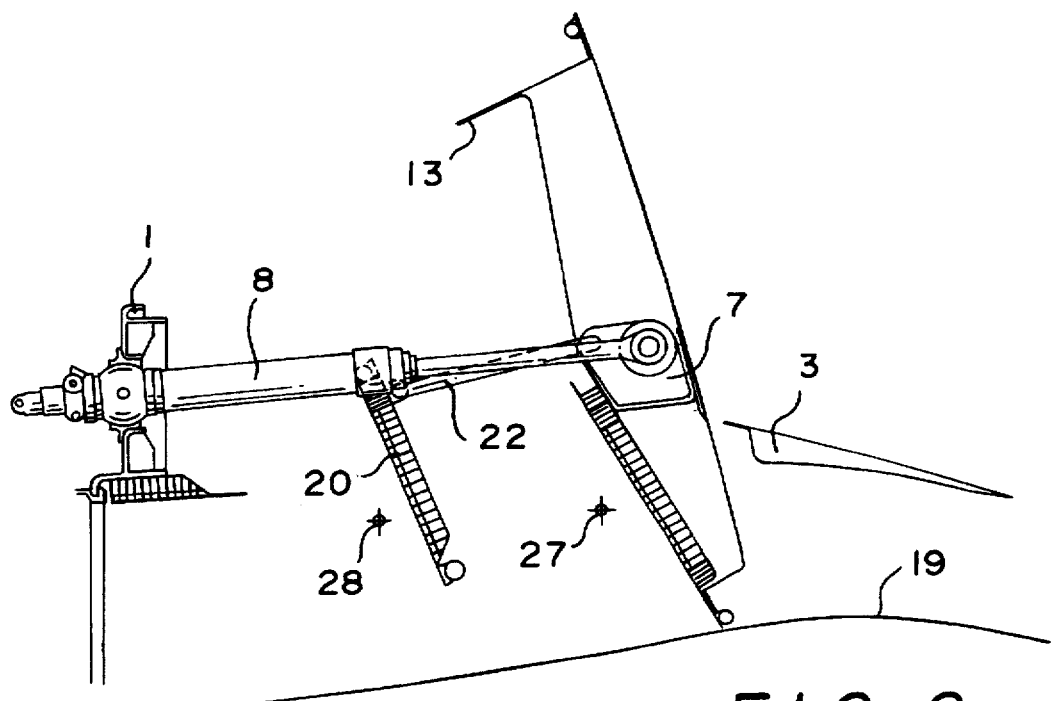
FIG. 2 is a view similar to FIG. 1, but illustrating the reverse thrust positions of the known thrust reverser door and the thrust reverser panel.
Figure 3:
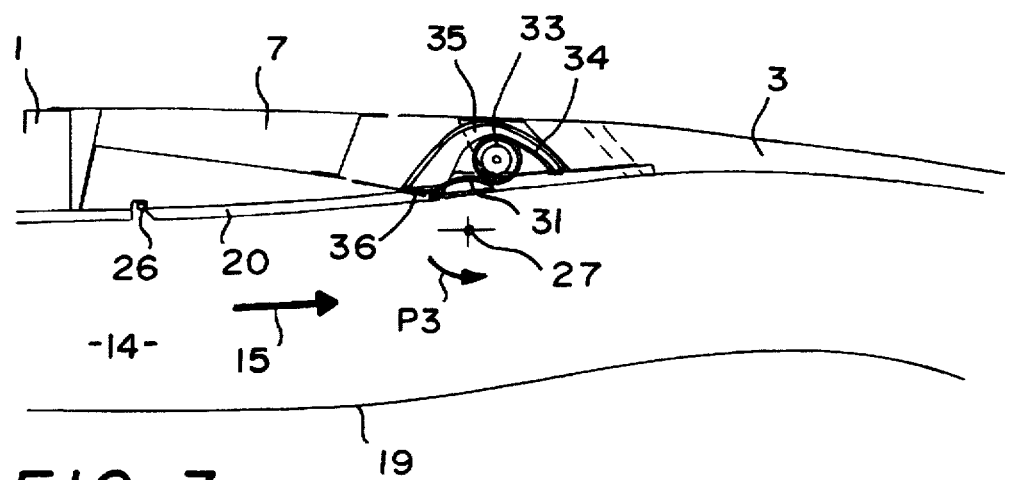
FIG. 3 is a partial, cross-sectional view illustrating a first embodiment of a thrust reverser according to the present invention with the thrust reverser door and the thrust reverser panel in the forward thrust positions.
Figure 4:
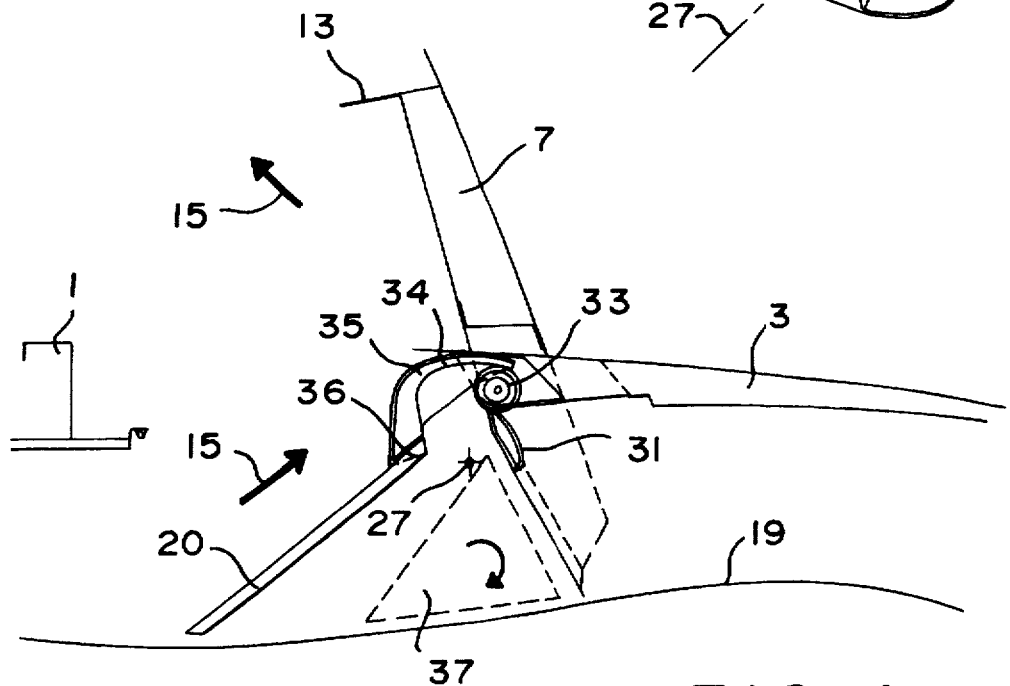
FIG. 4 is a cross-sectional view similar to FIG. 3, but illustrating the reverse thrust positions of the thrust reverser door and the thrust reverser panel.

In the description of the embodiments of the present invention, those elements having the same, or similar, function and/or structure as elements in the known prior art have been assigned the same identifying numerals as in FIGS. 1 and 2. Thus, as illustrated in FIGS. 3 and 4, the thrust reverser according to the present invention is utilized with a housing having an upstream portion 1 and a downstream portion 3 interconnected by longitudinally extending portions (not shown) such that the housing defines one or more lateral openings. A thrust reverser door 7 is pivotally attached to the housing so as to pivot about axis 27 between a forward thrust position, illustrated in FIG. 3, and a reverse thrust position, illustrated in FIG. 4. A thrust reverser panel 20 is also pivotally attached to the housing so as to pivot about axis 27 between a forward thrust position, illustrated in FIG. 3, and a reverse thrust position, illustrated in FIG. 4.

As can be seen in FIG. 3, when the thrust reverser door 7 and the thrust reverser panel 20 are in their forward thrust positions, the inner surface of the thrust reverser panel 20 and an inner surface of a rear portion of the thrust reverser door 7 form a portion of the outer boundary of duct 14. Duct 14 is generally annular in configuration, the inner boundary being formed by the housing 19 which encloses the turbojet engine (not shown). Gases pass through the duct 14 in the direction of arrow 15, from an upstream direction (towards the left as viewed in FIG. 3) toward a downstream direction (toward the right as viewed in FIG. 3). When the thrust reverser door 7 and the thrust reverser panel 20 are deployed to their reverse thrust positions, as illustrated in FIG. 4, the gases in the duct 14 are directed laterally outwardly through the opening in the housing as illustrated by arrows 15. Deflector 13 may be provided on the forward, or upstream end of the thrust reverser door 7 to impart a more forward direction to the gases passing through the lateral openings in the housing.

Figure 5:
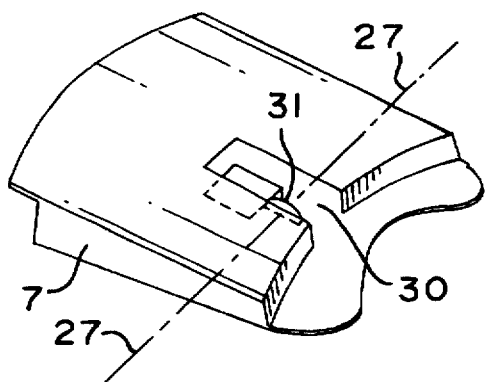
FIG. 5 is a perspective view of the thrust reverser door utilized in the embodiment of FIGS. 3 and 4.

An epicyclic gear mechanism is interposed between the thrust reverser door 7, the thrust reverser panel 20 and the housing so as to cause the door 7 and the panel 20 to pivot in opposite directions about the common pivot axis 27. A segment of a sun gear 31 is fixedly attached to the thrust reverser door 7 and is located within a recesses 30, as best illustrated in FIG. 5. The sun gear segment 31 is fixedly attached to the door 7 so as to move with the door 7 as it moves between its forward and reverse thrust positions. The sun gear segment 31 engages a planet pinion gear 33 that is rotatably affixed to the downstream portion 3 of the housing. As best seen in FIG. 6, the downstream portion 3 of the housing has a support arm or portion 32 extending in a forward direction from a rear most edge of the lateral opening and to which is rotatably attached to the planet pinon gear 33. The support portion 32 is configured so as to fit into the recess 30 of the thrust reverser door 7 such that the sun gear segment 31 will engage the planet pinion gear 33 throughout the range of movement of the thrust reverser door 7. Since the sun gear segment 31 is affixed to the thrust reverser door 7, movement of the thrust reverser door 7 with respect to the housing will cause the rotation of the planet pinion gear 33. A ring gear segment 34 is affixed to the rearmost edge 36 of the thrust reverser panel 20 by support 35. As illustrated in FIGS. 4, 7A and 7B, the ring gear segment 34 engages the planet pinion gear 33. Thus, movement of the thrust reverser door 7 with respect to the housing in a first direction, will cause the pivoting movement of the thrust reverser panel 20 with respect to the housing in an opposite direction.

During forward thrust operation, when both the thrust reverser door 7 and the thrust reverser panel 20 are in their forward thrust positions, as best illustrated in FIG. 3, known locking systems are typically incorporated to physically latch the thrust reverser door 7 to the housing and to hydraulically lock the actuator so as to prevent the thrust reverser door 7 from being accidentally deployed toward the reverse thrust position. The present invention provides an additional, fail-safe back up to these known locking systems to render the forward thrust position the stable position for the thrust reverser door thereby rendering it self-closing. Forces acting on the inner surface of the thrust reverser panel 20 by the pressurized gases within the duct 14 will urge the thrust reverser panel in a clockwise direction about pivot axis 27 (as viewed in FIG. 3). Such a force will be transmitted through the epicyclic gear mechanism to the thrust reverser door 7 and will, thereby, urge the thrust reverser door 7 in a counter-clockwise direction about the pivot axis 27, so as to maintain it in its forward thrust position. Thus, even if all of the known latches and hydraulic locks should inadvertently malfunction, the thrust reverser door 7 will still be prevented from any accidental deployment toward the reverse thrust position.

The thrust reverser door 7 is connected to an actuator which is known per se and which is omitted from the drawings. Such an actuator may comprise a hydraulic cylinder, as illustrated in the prior art in FIGS. 1 and 2, that is interconnected between the thrust reverser door 7 and the upstream portion 1 of the housing. To transit from the forward thrust position, shown in FIG. 3, to the reverse thrust positions, shown in FIG. 4, the known hydraulic actuator will move the thrust reverser door 7 in a clockwise direction about pivot axis 27. As noted previously, such movement of the thrust reverser door will impart a pivotal motion to the thrust reverser panel 20 in a counter-clockwise direction about the same pivot axis 27. Although only a single planet pinion 33 is illustrated in the figures, it is to be understood that a plurality of such planet pinion gears may be utilized without exceeding the scope of this invention.

Once the thrust reverser door has reached its reverse thrust position, aerodynamic leakage past the portion of the thrust reverser door 7 extending into the duct 14 is minimized by forming the rearmost portion of the thrust reverser door 7 complementary to the cross-sectional configuration of the inner housing 19. In the reverse thrust positions, the flow through the duct 14 is deflected by the thrust reverser panel 20 laterally outwardly through the opening formed in the housing.

In the known thrust reverser, illustrated in FIGS. 1 and 2, under special circumstances of flow rate, the force p1 acting on an inner surface of the thrust reverser panel 20 will be transferred to the thrust reverser door 7 via the connecting link 22, which will exert a force on the thrust reverser door 7 in the direction of arrow F1. This force will exert a torque p3 on the thrust reverser door 7 urging it to pivot about axis 27 toward the reverse thrust position.

In contrast, the forces acting on the thrust reverser door caused by the pressurized gases acting on the inner surface of thrust reverser panel 20 will urge the thrust reverser door 7 to maintain its forward thrust position. Consequently, when in the forward thrust mode of operation, the present thrust reverser eliminates any danger of inadvertent deployment of the thrust reverser door 7. Furthermore, the mounting of the thrust reverser panel 20 to the housing so as to pivot about a common axis with the thrust reverser door 7 enables the number of components utilized in the present invention to be reduced in comparison to the known thrust reverser.

When the thrust reverser panel 20 is in the reverse thrust position, as illustrated in FIG. 4, it masks a dead zone 37 in the gas flow recirculation, thereby improving performance and flow magnitude.

The intermediate positions of the thrust reverser panel 20 and the thrust reverser door 7, illustrated in FIG. 7A, when transitting toward the reverse thrust position facilitates transient conditions and avoids the drawbacks at this state of the operation by the known thrust reversers.

The sealing of the thrust reverser panel 20 is implemented by seals 26 on the upstream edge portion of the housing 1 and at the rear of the thrust reverser panel 20 on the thrust reverser door 7. As best illustrated in FIG. 8, the seals 26 engage only one side of the thrust reverser panel 20 whereas, in the known thrust reverser system, analogous seals are engaged on both sides of the thrust reverser panel 20.

A second embodiment of the present invention is illustrated in FIGS. 9–11. In this embodiment, the epicyclic gear mechanism comprises a sun gear 127 attached to the thrust reverser door 7 such that the central axis of the sun gear 131 is coincident with the pivot axis 127. A plurality of planet pinions 133 are rotatably affixed to the housing and engage the sun gear. Although four such pinion gears 133 are illustrated, it is to be understood that more or less than this number may be utilized without exceeding the scope of this invention. Finally, a ring gear 134 is fixedly attached to the thrust reverser panel 20 and engages the planet pinions 133. In this embodiment, the structure is somewhat simplified insofar as the support arm 32 is eliminated. In operation, this embodiment is identical to that previously described. The epicyclic gear mechanism causes the thrust reverser door 7 and the thrust reverser panel 20 to pivot about a common axis in opposite directions as these elements move between their forward thrust and reverse thrust positions.

An actuator which may be of the rotary type, may be directly connected to the epicyclic gear mechanisms to provide the actuating force for moving the thrust reverser door 7 and the thrust reverser panel 20 between their forward and reverse thrust position. Thus, such a rotary actuator may be connected to the planet pinion 33 in the first embodiment, or to the sun gear 131 or a planet gear 133 in the second embodiment.

The foregoing description is provided for illustrative purposes only and should not be construed as in any way limiting this invention, the scope of which is defined solely by the appended claims.

I claim:

1. A thrust reverser for a turbojet engine having a housing forming an outer boundary of a duct through which gases pass in an upstream to downstream direction the housing having at least one lateral opening, the thrust reverser comprising:

a) at least one thrust reverser door pivotally attached to the housing so as to be movable about a pivot axis between a forward thrust position wherein the at least one thrust reverser door covers the lateral opening and wherein an inner portion of the at least one thrust reverser door forms a part of the boundary of the duct, and a reverse thrust position wherein the at least one thrust reverser door uncovers the lateral opening and directs gases flowing through the duct outwardly through the lateral opening;

b) a least one thrust reverser panel pivotally attached to the housing so as to be movable about the same pivot axis as the at least one thrust reverser door between a forward thrust position, wherein an inner surface forms a portion of the outer boundary of the duct, and a reverse thrust position wherein the at least one thrust reverser panel directs at least a portion of the gases outwardly through the lateral opening; and, c) an epicyclic gear mechanism connected to the housing, the at least one thrust reverser door and the at least one thrust reverser panel such that the at least one thrust reverser door and the at least one thrust reverser panel move in opposite directions around the pivot axis between their forward and reverse thrust positions whereby when the at least one thrust reverser panel is in its forward thrust position a force exerted on an inner surface of the at least one thrust reverser panel by pressurized gases in the duct will urge the at least one thrust reverser door to remain in its forward thrust position.

2. The thrust reverser of claim 1 wherein the epicyclic gear mechanism comprises:

a) a sun gear segment fixedly located on the at least one thrust reverser door so as to move therewith;

b) a pinion gear rotatably located on the housing and engaging the sun gear segment; and, c) a ring gear segment fixedly located on the at least one thrust reverser panel and engaging the pinion gear.

3. The thrust reverser of claim 2 further comprising an actuator connected to the housing and to the at least one thrust reverser door so as to move the at least one thrust reverser door between its forward and reverse thrust positions.

4. The thrust reverser of claim 2 further comprising an actuator drivingly connected to the pinion gear so as to move the at least one thrust reverser door and the at least one thrust reverser panel between their forward and reverse thrust positions.

5. The thrust reverser of claim 1 wherein the epicyclic gear mechanism comprises:

a) a sun gear affixed to the at least one thrust reverser door;

b) at least one planet pinion gear rotatably affixed to the housing and engaging the sun gear; and, c) a ring gear affixed to the at least one thrust reverser panel and engaging the at least one planet pinion gear.

6. The thrust reverser of claim 5 wherein the sun gear is located so as to rotate about the pivot axis.

7. The thrust reverser of claim 6 further comprising an actuator drivingly connected to the sun gear so as to move the at least one thrust reverser door and the at least one thrust reverser panel between their forward and reverse thrust positions.

* * * * *